US012643560B1

(12) United States Patent
Wiener

(10) Patent No.: US 12,643,560 B1
(45) Date of Patent: Jun. 2, 2026

(54) TESTING AUTONOMOUS VEHICLE CONTROL PERFORMANCE BASED ON DYNAMIC INPUT DATA

(71) Applicant: Zoox, Inc., Foster City, CA (US)

(72) Inventor: Adam Kane Wiener, New York, NY (US)

(73) Assignee: Zoox, Inc., Foster City, CA (US)

( * ) Notice: Subject to any disclaimer, the term of this patent is extended or adjusted under 35 U.S.C. 154(b) by 855 days.

(21) Appl. No.: 18/072,514

(22) Filed: Nov. 30, 2022

(51) Int. Cl.
| | |
|---|---|
| *B60W 50/06* | (2006.01) |
| *B60W 50/04* | (2006.01) |
| *G06F 11/3668* | (2025.01) |
| *B60W 50/00* | (2006.01) |
| *B60W 50/14* | (2020.01) |

(52) U.S. Cl.
CPC .......... *B60W 50/06* (2013.01); *B60W 50/045* (2013.01); *B60W 2050/0028* (2013.01); *B60W 2050/146* (2013.01); *G06F 11/3672* (2013.01)

(58) Field of Classification Search
CPC ............... B60W 50/045; B60W 50/06; B60W 2050/0028; B60W 2050/146; G06F 11/3672
See application file for complete search history.

(56) References Cited

U.S. PATENT DOCUMENTS

| | | | | |
|---|---|---|---|---|
| 9,632,502 | B1 * | 4/2017 | Levinson ................. | G06N 7/01 |
| 11,210,200 | B2 * | 12/2021 | Morley ............... | G06F 11/3688 |
| 11,693,753 | B2 * | 7/2023 | Ponnuvel ................ | G06F 11/27 |
| | | | | 714/733 |
| 12,430,236 | B2 * | 9/2025 | Muehlenstaedt ..... | G06F 11/368 |
| 2021/0276587 | A1 * | 9/2021 | Urtasun .............. | G06F 11/3013 |
| 2021/0294944 | A1 * | 9/2021 | Nassar ................. | G05D 1/0088 |

OTHER PUBLICATIONS

Don, R. & Ciuffo, B. "Virtual Testing of Automated Driving Systems. A Survey on Validation Methods" IEEE Access, vol. 10, pp. 24349-24367 (Feb. 2022) available from <https://ieeexplore.ieee.org/abstract/document/9718588> (Year: 2022).*
Huang, W., et al. "Autonomous Vehicles Testing Methods Review" IEEE 19th Int'l Conf. on Intelligent Transportation Sys., pp. 163-168 (2016) (Year: 2016).*
Koopman, P. & Wagner, M. "Challenges in Autonomous Vehicle Testing and Validation" SAE Int'l J. Transportation Safety, vol. 4, No. 1, pp. 15-24 (2016) (Year: 2016).*

* cited by examiner

*Primary Examiner* — Jay Hann
(74) *Attorney, Agent, or Firm* — Lee & Hayes, P.C.

(57) ABSTRACT

Techniques for verifying operation of testing mechanisms are discussed herein. For example, a computing device can implement a testing component to test performance of a vehicle controller configured to control operation of a vehicle. The testing component can apply one or more heuristics and/or machine learned models to initiate, perform, and analyze tests that measure whether an instruction update improves performance of the vehicle controller and/or whether the instruction update causes performance of another component to degrade. The testing component can be used to validate the instruction update in a testing environment prior to transmitting the instruction update to a vehicle controller coupled to a vehicle in a real-world environment.

20 Claims, 5 Drawing Sheets

100

200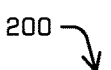

RECEIVE DYNAMIC INPUT
DATA AND AN
INSTRUCTION UPDATE
202

• • •

INPUT DATA 204

↓

TESTING COMPONENT 104

---

DETERMINE TESTS FOR
ONE OR MORE
COMPONENTS OF A
COMPUTING DEVICE
206

• • •

TESTING COMPONENT 104

EXAMPLE:
• ASSIGN TESTS TO COMPONENT(S)
• DETERMINE PRE-DEFINED TESTS
• RECEIVE TEST CRITERIA FROM A
  USER

---

COMPARE TEST RESULTS
TO DETERMINE
PERFORMANCE THE ONE
OR MORE COMPONENTS
208

• • •

TESTING COMPONENT 104

EXAMPLE:
• IDENTIFY CHANGE IN COMPONENT
  PERFORMANCE
• COMPONENT PASS/FAIL RELATIVE
  TO METRIC

---

VALIDATE THE
INSTRUCTION UPDATE
BASED ON AGGREGATED
TEST RESULTS
210

• • •

TESTING COMPONENT 104

EXAMPLE:
• APPROVE INSTRUCTION UPDATE
  FOR USE BY A VEHICLE
• FLAG INSTRUCTION UPDATE FOR
  FURTHER ACTION

FIG. 2

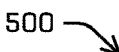

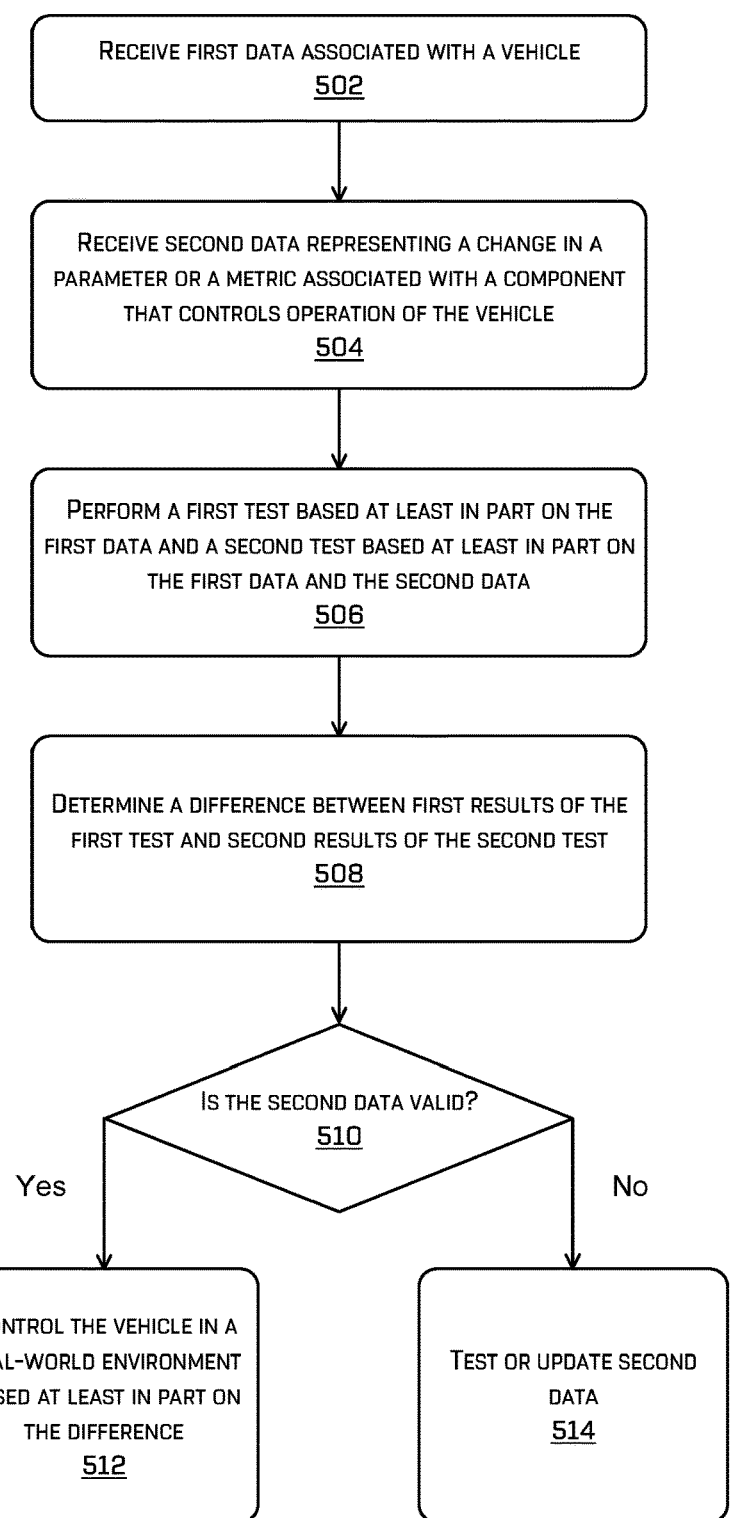

500

RECEIVE FIRST DATA ASSOCIATED WITH A VEHICLE
502

RECEIVE SECOND DATA REPRESENTING A CHANGE IN A PARAMETER OR A METRIC ASSOCIATED WITH A COMPONENT THAT CONTROLS OPERATION OF THE VEHICLE
504

PERFORM A FIRST TEST BASED AT LEAST IN PART ON THE FIRST DATA AND A SECOND TEST BASED AT LEAST IN PART ON THE FIRST DATA AND THE SECOND DATA
506

DETERMINE A DIFFERENCE BETWEEN FIRST RESULTS OF THE FIRST TEST AND SECOND RESULTS OF THE SECOND TEST
508

IS THE SECOND DATA VALID?
510

Yes                 No

CONTROL THE VEHICLE IN A REAL-WORLD ENVIRONMENT BASED AT LEAST IN PART ON THE DIFFERENCE
512

TEST OR UPDATE SECOND DATA
514

FIG. 5

TESTING AUTONOMOUS VEHICLE CONTROL PERFORMANCE BASED ON DYNAMIC INPUT DATA

BACKGROUND

A computing device can include sub-systems that control different aspects of an electric vehicle. Each sub-system can be tested to ensure that the sub-system operates as expected. Testing each sub-system can include comparing outputs by the sub-system to a baseline value. The overall performance of the electric vehicle can depend upon outputs from the sub-systems collectively. Changing one sub-system (e.g., updating code) can affect the output of another sub-system which may lead to a degradation in overall performance of the electric vehicle. Further, the tests can be configured to evaluate certain conditions which do not always reflect how the sub-system will perform under other conditions such as those in a real-world environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 is a pictorial diagram illustrating an example implementation to validate an update to a vehicle controller by implementing an example test component to test the update as described herein.

FIG. 5 is a flowchart depicting an example process for testing and validating an instruction update for an example component.

DETAILED DESCRIPTION

Figure 1:
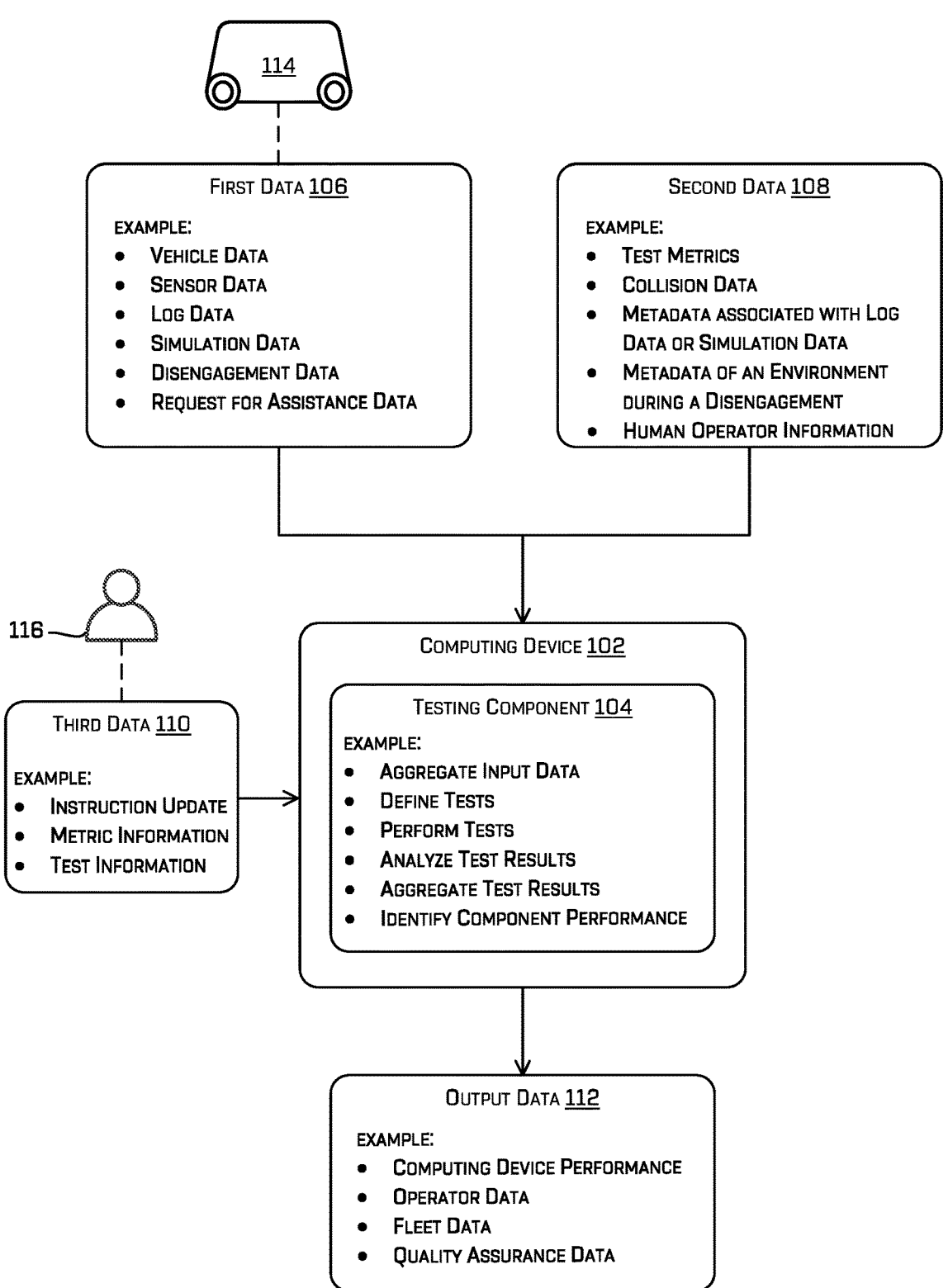
FIG. 1 illustrates an example block diagram of an example computer architecture for implementing techniques to test whether a change to a component causes an unintended impact on performance of another component.

Techniques for verifying operation of testing mechanisms are discussed herein. In some examples, evaluating changes in a complex system comprising multiple machine learned models can be difficult due in part to changes in training data and/or datasets over time. For example, in examples when input data to the computer sub-system changes dynamically over time, baseline comparisons can rarely be determine. Further, testing in a simulated environment can produce test results that reflect relatively high vehicle performance in the simulated environment while failing to implement tests that capture vehicle performance in a real-world-environment.

This application describes techniques for testing performance of a vehicle controller configured to control operation of a vehicle. The techniques can include a computing device implementing a testing component configured to test performance of the vehicle controller and also test performance of another component of the vehicle. For example, instructions associated with the vehicle controller can be updated to add new functionality, fix a bug, or otherwise improve accuracy of an output by the vehicle controller (or determination therefrom). The testing component can initiate tests that measure whether the update to the instruction improves or degrades performance of the vehicle controller, another vehicle component, or the vehicle itself. In examples with no degradation in performance by the other component, the computing device can validate the instruction update for use by a vehicle controller associated with a vehicle computing device. In examples with degradation in performance by the other component, the computing device can perform another test, output a human-readable representation of the degradation for presentation to a user to validate the degradation as expected or unexpected, and/or output an indication to review the instruction update. Thus, the testing component can be used to validate an instruction update in a testing environment prior to transmitting the instruction update to a vehicle controller coupled to a vehicle in a real-world environment.

Generally, the testing techniques described herein can be implemented to test an impact of adding, removing, or modifying an instruction (e.g., a computer-readable instruction) to a computing device associated with multiple components that are configured to control a robotic device. Input data to at least one of the multiple components can change over time as the robotic device operates in an environment. In addition to changing input data, metrics for assessing performance of a component can also change over time making it difficult to determine whether the performance of the robotic device is improving or degrading over time. The techniques can include determining tests for evaluating the impact of uploading the instruction to the robotic device for use in controlling the robotic device as well as identifying tests that capture performance by the robotic device at different times despite changes in an operating version or metric used to measure the performance at different times. For example, the robotic device can be an autonomous vehicle comprising a vehicle computing device(s) that implements a plurality of machine learned models to control the autonomous vehicle in a real-world environment. In such examples, log data associated with the autonomous vehicle can change over time as the autonomous vehicle operates in the environment. Further, other data, such as map data, can be dynamically updated by the autonomous vehicle, or another autonomous vehicle in a fleet.

In some examples, the testing component can perform tests that measure performance of a first component and/or performance of a second component associated with a vehicle computing device configured to control operation of an autonomous vehicle. The first component and/or the second component can, for example, represent a vehicle controller, a system controller, a localization component, a planning component, or other component of the vehicle computing device. The testing component can perform the tests to validate that the first component improves performance without causing performance of the second component to regress over time. The testing component can select a test from available tests (e.g., pre-defined tests) based on metric(s) associated with each test (e.g., what each test is configured to measure). In some examples, the metric for a test can change (e.g., the definition of a stop can change) resulting in different controllers using different thresholds to control braking, acceleration, and/or steering systems of the autonomous vehicle. For example, the testing component can receive data indicating that a metric for defining a stop for the first component (e.g., a controller generating and/or transmitting instructions that control vehicle braking) has been updated (e.g., an instruction update), and verify that the second component produces same test results for a first test performed prior to the update to the first component and a second test performed after the update to the first component. For example, if the test results are different between the first test and the second test, the testing component can output an indication that the update to the first component caused the second component to generate different output data with and without the update. Given that the update was intended only for the first component, the change in test results associated with the second component can be flagged as an unintended consequence of the update. By implementing the techniques described herein, the vehicle computing device can receive instruction updates from the testing component that are tested and validated to accurately assess performance by the autonomous vehicle over time.

In some examples, the testing component can receive a variety of different types of data as input including data representing different times and/or different sources (e.g., data associated with a vehicle, an environment, a remote operator, etc.). Input data can include one or more of: log data, performance data associated with the vehicle, sensor data, map data representing an environment, requests by the vehicle for assistance by a human operator, data associated with the human operator, etc. The input data can change dynamically over time including while the testing component implements tests to evaluate performance of one or more components. The testing component can, for example, implement test(s) to capture intended changes to a component being updated as well as unintended changes associated with the same component and/or another component not being updated. Generally, updating a component can refer to modifying a kernel, computer-readable instruction, a parameter, a metric, and/or a test that causes the component to perform functionality such as controlling some aspect of the vehicle.

In various examples, the testing component can implement different tests for one or more components to identify whether an unintended change (e.g., a regression of performance, an improvement of performance) occurs in a component of a computing device. The computing device can be configured to control operation of the vehicle in an environment based on outputs from a plurality of components that each contribute to the overall performance of the vehicle. For instance, the testing component can determine a first test to evaluate performance (e.g., determine a first response relative to a first metric) for a first component associated with an update, and a second test different from the first test to evaluate performance (e.g., determine a second response relative to a second metric) for the first component and/or for a second component. In some examples, the testing component can aggregate test results from the first test and the second test to determine whether or not to use the update to control operation of a vehicle in a real-world environment.

The test component can, for example, aggregate test results by determining a number of test results associated with a pass status and/or a number of test results associated with a failure status relative to metric(s) associated with the first test and/or the second test. For example, the testing component can determine a pass status and/or a failure status for each test performed with each component based on responses by a respective component relative to the metric(s). In this way, test results can be interpretable by a user (or heuristics, a machine learned model, etc.) to validate the update to the instructions for upload to the computing device to control the vehicle in the environment. By implementing the testing techniques described herein, changes to instructions associated with the computing device (e.g., updating a metric used to evaluate the component, updating a parameter of a perception component or a planning component, etc.) can be evaluated to determine potential unintended regression of vehicle performance or unintended improvement of vehicle performance.

In various examples, the test component can output data representing the test results for presentation in a user interface of a display device. For example, the user interface can enable a user to initiate tests, analyze test results, and/or provide input indicating a test or a metric to use for a particular component. In some examples, functionality provided by the testing component can be implemented responsive to an input received via the user interface (e.g., a test can be initiated based on a user input). In various examples, the test results can be aggregated to present information useful for the user to verify whether degradation in performance of a component is valid or invalid based on a type of update being tested.

In some examples, functionality provided by the testing component can be implemented automatically responsive to detecting an update to instructions associated with a computing device (or component thereof). For example, the testing component can detect that a vehicle controller of a vehicle computing device received an instruction update and initiate test(s) to identify a potential impact to another component or controller that did not receive the instruction update. The instruction update can be removed from the computing device in examples when the other component fails more tests than before the instruction update. Typical testing techniques rely on fixed input data that can be used as a baseline for determining a difference between tests.

In some examples, the testing component can output a confidence score indicating a level of confidence in the test for determining overall performance of the vehicle. For instance, a vehicle computing device can have multiple components each configured to control different aspects of a vehicle. The testing component can initiate tests that reflect a relationship among components based on identifying unintended changes in component performance over time.

In some examples, the testing component can determine one or more pre-defined tests for identifying a) an intended performance change relative to a first metric of a first component being updated, and b) an unintended performance change relative to second metric of a second component (e.g., regression or improvement). For example, tests can be defined based at least in part on user input indicating which types of tests best capture changes to specific types of instruction changes. In some examples, the testing component can execute ten to twenty pre-defined tests to identify whether a potential instruction update improves performance of the component being updated without causing a change in performance of another component that was not updated.

In some examples, some or all of the aspects of the techniques for determining and performing tests can be performed by a machine learned model (e.g., a neural network, a convolutional neural network, a recurrent neural network, a curve fitting, statistical modeling, and the like) trained to perform the particular technique. A machine learned model can be trained based on data manually or automatically annotated to select tests and metrics that predict future component performance in a real-world environment. For instance, the machine learned model can receive annotated data as ground truth representing test types, test results, component performance, pass status, failure status, and the like. The ground truth can include expected test results for a given metric or set of metrics associated with a component.

The testing techniques described herein can improve functioning of a computing device by providing a robust method of determining test results that accurately reflect component performance not just in the testing environment but also in a real-world environment. For example, the computing device can determine a test that tests the right type of responses by the component to conclude that the component is operating safely. By comparing test results with and without a proposed instruction update, systems that receive changing input data over time can determine component performance without relying on or comparing an output to a baseline value, which can improve accuracy of component outcomes which can further improve safety for an autonomous vehicle that uses outcomes from the component to navigate in a real-world environment. In some examples, the techniques can be used in a self-test operation associated with a system to evaluate a performance of the system which provides for greatly improved overall reliability and safety outcomes. Further, the techniques discussed herein may be incorporated into a system that can be validated for safety.

FIG. 1 illustrates an example block diagram 100 of an example computer architecture for implementing techniques to test whether a change to a component causes an unintended impact on performance of another component. The testing techniques of FIG. 1 can be implemented in a testing environment having at least some input data that changes dynamically over time. In some examples, the techniques described in FIG. 1 can be performed by the vehicle computing device(s) 404 and/or the computing device(s) 438 of FIG. 4.

As shown, a computing device 102 comprising a testing component 104 configured to receive first data 106, second data 108, and third data 110 as input. Generally, the testing component 104 represents functionality to aggregate input data from multiple sources and/or times, define a test for a component, perform one or more tests, analyze test results, aggregate test results, and/or identify changes in component performance based on the test results. The testing component 104 can determine output data 112 indicative of performance of different components of the computing device 102 and/or performance of a vehicle or other robotic device the computing device is configured to control. For example, the computing device 102 can test whether an instruction update intended for a first component degrades performance of a second component that is not intended to receive the instruction update. In some examples, representations of the output data 112 can be output in a user interface on a display device for a user to validate that a change in performance to the second component is expected based on the instruction update to the first component. In some examples, the testing component 104 can validate the instruction update for sending to a vehicle computing device associated with an autonomous vehicle based at least in part on comparing the aggregated test results to one or more metrics (without requiring presentation of the output data 112 in the user interface).

The testing component 104 can receive, for example, the first data 106 that is associated with a vehicle 114 such as an autonomous vehicle navigating in an environment. The first data 106 can represent one or more of: vehicle data (a current vehicle state) associated with the vehicle 114, sensor data from one or more sensors associated with the vehicle 114, log data, simulation data, data indicating that a vehicle computing device generated a request for assistance to a remote entity or is otherwise requesting input that enables the vehicle 114 to autonomously navigate in the environment. In some examples, the first data 106 can represent vehicle information as the vehicle 114 navigated in a real-world environment or a simulated environment at a current time or a previous time. Sensor data captured by sensors associated with the vehicle 114 can change over time as the vehicle 114 follows a trajectory to reach a destination in the environment thus at least some of the data input into the testing component 104 can change from a first time to a second time. In various examples, the first data 106 can indicate how often a vehicle computing device of the vehicle 114 delayed making a determination for a threshold amount of time (e.g., causing the vehicle 114 to disengage for the environment momentarily). For example, the first data 106 can represent a number of instances for a given timeframe or distance travelled that the vehicle 114 was unable to determine a trajectory for a threshold amount of time or sends data to a remote computing device requesting assistance.

The second data 108 can represent a metric to associated with a test (e.g., a category or definition to be met to pass the test), collision data between the vehicle 114 and an object in a simulated environment or a real-world environment, metadata describing reasons for the vehicle 114 to request assistance or reasons the vehicle computing device was unable to determine a trajectory for the vehicle 114 to follow within a threshold amount of time. The second data 108 can represent metadata describing characteristics of the environment, the vehicle, and/or the object during a collision or disengagement (e.g., the vehicle sends a request for assistance, a remote operator controls at least a portion of the vehicle, the vehicle is unable to generate a trajectory for a threshold period of time, etc.) associated with the vehicle 114. In some examples, a disengagement can represent an output of a model that predicts disengagements. In some examples, the second data 108 can describe crosswalk permission, roadway intersections, traffic signs, objects obeying traffic laws, and so on, for log data and/or simulation data associated with the vehicle 114.

In examples that a remote operator provides assistance to the vehicle 114 responsive to the request from the vehicle computing device, the second data 108 can include data associated with a human operator (e.g., hours worked per shift, experience level, etc.) rendering assistance to the vehicle 114. In some examples, the vehicle 114 can send a request for assistance to a remote operator that can return a candidate trajectory for the vehicle 114 to consider during planning operations.

The computing device 102 can also or instead receive the third data 110 that is generally associated with a user 116 such as when the user provides an instruction update (e.g., a change to a computer-readable instructions associated with a vehicle controller or component). The third data 110 can also or instead represent metric information provided by the user 116 such as a change in a metric used to measure component performance. The third data 110 can, for example, be indicative of test information specified by the user 116 (or a machine learned model in other examples). In various examples, the third data 110 can indicate an instruction to use with a component, a metric(s) to capture during the test, and one or more tests (pre-defined tests) to execute for particular components.

In various examples, the vehicle 114 can include one or more vehicle computing devices that implement various components that collectively control various aspects of the vehicle (e.g., a propulsion system, a braking system, a steering system, and so on). The testing component 104 can be employed to validate an instruction update (or other third data) prior to transmitting the instruction update to the vehicle computing device(s) to control the vehicle 114 in a real-world environment. In this way, changes associated with fixing bugs in computer instructions, providing performance enhancements, adding new features, testing metrics, etc. can be tested to validate that the changes did not cause another component to perform an action that would change the validity of the metrics corresponding to the other component. Using the testing techniques as described herein can include aggregating test results of a targeted metric (a component to receive the change) as well as test results associated with other metrics for another component not being updated directly. In such examples, if the test results associated with the other metrics are substantially affected between tests, then the testing component 104 can output an indication that the change has potentially unintended consequences, and a representation of the test results can be configured for presentation on a display device for consideration by the user 116 to confirm whether the potentially unintended consequences are expected results due to a type of test performed, a type of change, and/or a relationship or dependence between the component being changed and the other component having the potentially unintended consequences.

The testing component 104 can aggregate the input data (e.g., the first data 106, the second data 108, and/or the third data 110) from various sources. The testing component 104 can also perform the tests to validate that a first component improves performance without causing performance of a second component to regress over time. The testing component 104 can select a test from available tests (e.g., pre-defined tests) based on metric(s) associated with each test (e.g., what each test is configured to measure). In some examples, the metric for a test can change (e.g., the definition of a stop at a stop sign or traffic light junction can change based on input from the user 116) resulting in different controllers using different thresholds to control braking, acceleration, and/or steering systems of the autonomous vehicle. For example, the testing component can receive data indicating that a metric for defining a stop the first component (e.g., a controller generating and/or transmitting instructions that control vehicle braking) has been updated (e.g., an instruction update), and verify that the second component produces same test results for a first test performed prior to the update to the first component and a second test performed after the update to the first component. For example, if the test results are different between the first test and the second test, the testing component can output an indication that the update to the first component caused the second component to generate different output data with and without the update. Given that the update was intended only for the first component, the change in test results associated with the second component can be flagged or otherwise indicated as an unintended consequence of the update. By implementing the techniques described herein, the vehicle computing device can receive instruction updates from the testing component that are tested and validated to accurately assess performance by the autonomous vehicle over time.

The test component 104 can, for example, aggregate test results (e.g., can determine aggregated data) by determining a number of test results associated with a pass status and/or a number of test results associated with a failure status relative to metric(s) associated with a particular test. For example, the testing component 104 can determine a pass status and/or a failure status for each test performed with each component based on responses by a respective component relative to the metric(s). In some examples, the testing component 104 can evaluate or analyze the test results to assess performance of each component and to ensure that a component does not regress and cause an overall level of performance associated with the computing device 102 to regress. Heuristics, a mathematical algorithm, and/or machine learned techniques can be employed by the testing component 104 to determine a difference between test results of various tests.

In various examples, the output data 112 can include data indicating operator data, fleet data associated with a fleet of autonomous vehicles, quality assurance data indicating quality of a controller associated with the computing device 102, or a quality for the vehicle 114 to operate safely in the environment. For example, the output data 112 can be used to send an instruction update to another vehicle in a fleet of vehicles, or to assess operation quality of the vehicle 114 as input data from the vehicle 114 changes over time.

FIG. 2 is a pictorial diagram illustrating an example implementation 200 to validate an update to a vehicle controller by employing an example test component to test the update as described herein. The example process 200 may be implemented by a computing device such as the vehicle computing device 404 and/or the computing device(s) 438 of FIG. 4. As shown, a computing device 102 can implement the testing component 104 to test an impact of the instruction update on a targeted component and on another component that is not targeted to receive the instruction update. In some examples, the computing device 102 can be associated with a test environment or a robotic device such as an autonomous vehicle navigating in a simulated environment and/or a real-world environment.

An operation 202 can include receiving dynamic input data including an update to an instruction that controls operation of a vehicle controller or component associated with an autonomous vehicle. In some examples, the testing component 104 can receive the input data 204 which can represent one or more of: the first data 106, the second data 108, and/or the third data 110. The input data 204 can represent, for example, data associated with a pipeline of a vehicle computing device of the autonomous vehicle. The pipeline of data can change over time as the autonomous vehicle receives new sensor data, changes a metric for a component, receives new log data, and so on.

An operation 206 can include determining tests for one or more components of a computing device associated with the autonomous vehicle. For example, the operation 206 can include the vehicle 402 implementing the testing component 432 to assign one or more test(s) to one or more components including identifying a pre-defined test (a test defined based at least in part on user input at a previous time). Each pre-defined test can, for example, be associated with a metric(s) that is configured to capture performance by a respective component (e.g., the vehicle controller or other component that is configured to control (or provide input to) some aspect of the autonomous vehicle). In some examples, the input data 204 can include an indication from a user to conduct a particular test, or set of tests.

An operation 208 can include comparing test results to determine performance of the one or more components. For example, the operation 208 can include the testing component 104 comparing first test results of a first test of a component without the instruction update with second test results of a second test of the component with the instruction update to the first component. The testing component can determine whether performance of the component improved or regressed from the first test to the second test. In some examples, the testing component 104 can compare test results for tests directed to at least a) a first component (or metrics thereof) targeted to receive the instruction update, and b) a second component not targeted to receive the instruction update. Performance of the first component or the second component can be based on evaluating actions or determinations by the respective component relative to a metric specific for each component. In some examples, the testing component 104 can determine a number of times the component passed or failed a metric over a time period of a test. If the second test indicates more failure instances than the first test, the testing component 104 can output an indication that performance of the component regressed over time. In some examples, multiple tests or metrics can be associated with a single component.

In various examples, the operation 208 can include the testing component 104 comparing first test results associated with different times. For example, test results associated with a first time without the update to the instruction that controls operation of the vehicle controller can be compared to second test results associated with a second time with the update to the instruction. In some examples, the first test results can be associated with an expected change to a first metric, and the testing component 104 can evaluate whether a change occurs to a second metric, and further compare the change to a metric threshold. In some examples, the change to the second metric can be expected (e.g., due to a correlation with the first metric) based on the change being below the threshold, or the change to the second metric can be unexpected based on the change meeting or exceeding the metric threshold. The metric threshold can represent a value that accounts for dynamic changes to the input data over time.

An operation 210 can include validating the instruction update based at least in part on aggregated test results. For example, the operation 210 can include the testing component 104 aggregating test results for different tests including determining a number of times that the first component and the second component pass or fail a respective metric relative to a safety threshold (e.g., a number of allowable fail statuses for a distance or time travelled). In various examples, aggregating the test results can include verifying that the second component does not include more test failures relative to the metric(s) for the test with the first component receiving the instruction update than without. In examples when the performance of the first and second components does not regress or degrade (by a threshold amount to account for dynamic input data), the testing component 104 can output data indicating that the instruction update is approved for use by a vehicle computing device to control a vehicle in an environment. In examples when the performance of the first component or the second component degrades, the testing component 104 can output data indicating to take a further action such as to further update the instruction, output the test results in a display device, perform another test, etc. For example, the testing component 104 can run another test to confirm the degradation in performance or flag the instruction update for correction to approve or deny the instruction update for use in a real-world environment.

In some examples, the testing component 104 can generate representations of the test results for presentation in a user interface. A user can verify that the degradation to the second component is an expected result of the instruction update to the first component based on a dependency between the first and second components. For example, changing a metric to define how the vehicle stops by a stop sign can be targeted for a system controller (a first component) of the vehicle computing device that controls braking can affect a planning component (a second component) despite not receiving the changed metric directly.

Using the techniques described herein, updates to a metric or a computer-readable instruction can be tested to detect problems in the updates and/or to approve the updates for use by a robotic device in a real-world environment (e.g., the test reflects how the robotic device will perform if the update is uploaded to the robotic device for use in the real-world environment).

Figure 3:
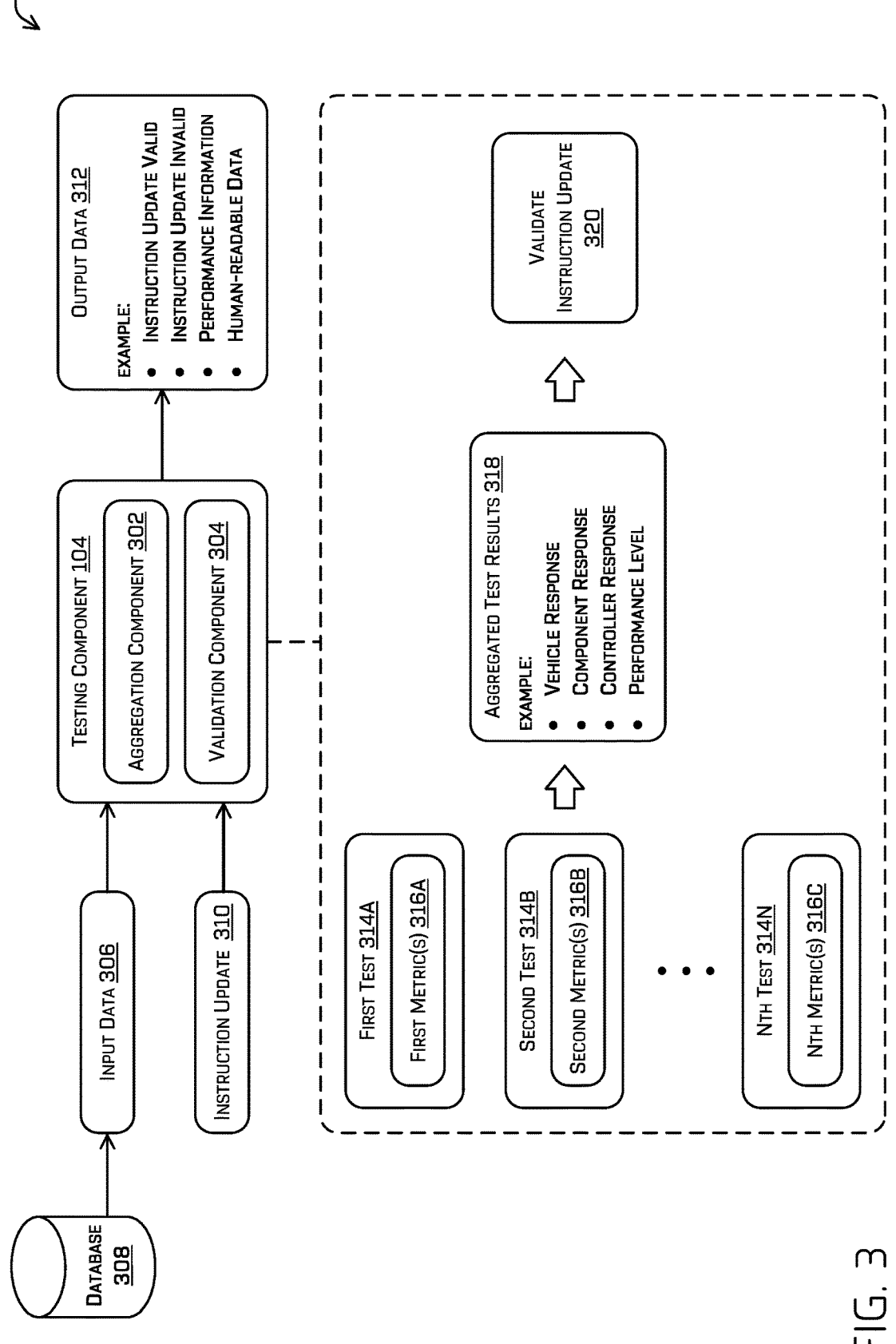
FIG. 3 is an illustration of another example environment in which an example testing component implements techniques to validate an instruction update as described herein.

FIG. 3 is an illustration of an example block diagram 300 in which an example testing component implements techniques to validate an instruction update as described herein. For instance, a computing device can implement the testing component 104 which, as shown, includes an aggregation component 302 and a validation component 304 to implement the testing techniques described herein. The testing component 104 can receive input data 306 from a database 308 and also receive an instruction update 310 usable to generate output data 312 indicating whether the instruction update is valid for use by a vehicle computing device (e.g., the vehicle computing device(s) 404) to navigate in an environment.

Generally, the aggregation component 302 can provide functionality to aggregate one or more of: the input data 306, test results associated with a particular component, and/or test results or multiple components that collectively control different aspects of a vehicle. The aggregation component 302 can generate aggregated test results for analysis by the validation component 304 that is configured to output a level of performance for a controller and/or component of a computing device implementing the testing component 104. In various examples, the computing device can represent a vehicle computing device comprising a combination of controllers and components that cause the vehicle to operate in an environment. That is, different components or controllers associated with a computing device can generate outputs that collectively control a vehicle in an environment. In various examples, the level of performance can be considered to represent a number of diagnostic tests associated with a pass status or a failure status. For example, if a test result is associated with a failure status, then the test result represents poor performance, and if the test result is associated with a pass status, then the test result represents good performance. In some examples, good performance can represent a passing rate or percentage given some number of input log data.

Generally, the input data 306 can represent a dataset that includes data having different sizes or dimensions, component interdependencies (e.g., upstream, downstream), dependencies among metrics, etc. Due to the large size of the input data 306, storing different instances of time is not practical for use as baseline data. Instead, in some examples, the testing component 104 receives input data that can represent data from one or more sources (e.g., the database 308, a vehicle, a computing device associated with a user, a server, a memory, etc.) including the first data 106, the second data 108, and/or the third data 110 of FIG. 1. The database 308 can comprise log data, sensor data, vehicle data, metric data, test data, and/or other data usable as input into the testing component 104. The input data 306 can change over time for a variety of reasons including new sensor data being available as the vehicle navigates. In some examples, the first data 106 can include sensor data from one or more sensor system(s) that include one or more of: a location sensor, a lidar sensor, a radar sensor, a camera, an inertial sensor, an environmental sensor, an audio sensor, and/or a time-of-flight sensor, just to name a few. For instance, the testing component 104 can receive sensor data captured by the one or more sensor system(s) usable to identify, detect, or otherwise determine an obstruction(s) associated with one or more sensor system(s). By applying heuristics and/or a machine learned model to sensor data received from the one or more sensor system(s), the testing component 104 can select or determine tests that capture performance of a component being tested.

The testing component 104 can receive an instruction update 310 which generally represents a change in how a controller or component operates (e.g., an update to a computer-readable instruction to fix a bug, provide new functionality, and so on). The instruction update 310 can also or instead represent a change to a metric for how a controller or component is evaluated with regard to a test (e.g., a user can set a new metric to measure performance of the controller or overall performance of the vehicle). In some examples, a developer or other user may provide input to define a metric for the vehicle to decelerate near a crosswalk and the metric can be associated with thresholds for braking, steering, and so on. The metric may indicate for the vehicle to slow to a target velocity within a threshold distance from the crosswalk, as one non-limiting example. The testing component 104 can test an impact of the instruction update 310 on performance of the controller or the component as well as performance of at least one other component (e.g., does performance of another component regress, and if so, is it an expected result or an unexpected result).

In some examples, the instruction update 310 can represent a metric for measuring a response by a controller, component, or the like. For example, a first metric can define how to respond to a pedestrian near a crosswalk, and other metrics can define what threshold to associated with steering, braking, accelerating, etc, for a pedestrian that is not in a crosswalk. Changes to the metrics can occur over time to cause the vehicle 114 to behave as desired relative an object (the pedestrian). By determining the tests and metrics as described herein, vehicle performance at two different times can be compared to show whether the vehicle performance improves over time despite changes in metrics, computer-readable instructions, etc. For instance, the testing component 104 can determine the output data 312 for use during training a machine learned model (labelling a reason for a disengagement, etc.) and/or quality assurance analysis (by a human and/or a machine learned model). In some examples, the output data 312 can indicate a distance traveled by the vehicle free of a request for assistance from a remote computing device and/or a disengagement. In this way, requests per mile or disengagements per mile can be used to compare vehicle performance for different times.

The testing component 104 can select, generate, or otherwise determine a first test 314A, a second test 314B, up to an Nth test 314N (collectively "tests 314"), where N can be any integer greater than 1. FIG. 3 shows the first test 314A associated with a first metric(s) 316A, the second test 314B associated with a second metric(s) 316B, up to Nth metric(s) 316N, (collectively "metrics 316"), where N can be any integer greater than 1. Multiple metrics can be associated with a single test to capture different responses by a vehicle, a component, or a controller. For instance, in examples when the instruction update 310 includes an update to a component configured to control braking of the vehicle, the metric can cause more relaxed or harsher braking to occur to safely navigate in different scenarios.

As mentioned, the aggregation component 302 can aggregate test results of the tests 314. The test results can represent a response by the component being updated, as well as a response by another component not being updated. The aggregation component 302 can assign a pass status or a failure status to indicate a performance level of the component when responded to the tests 314. Aggregated test results 318 can represent a number of pass or failure responses by a particular component or a number of pass or failure responses by all of the components tested. Accordingly, the aggregated test results 318 can indicate a level of performance for a component or a vehicle that operates based on outputs from the components. In various examples, the aggregated test results 318 associated with different times can be stored in a memory, database, or other storage device for access at a later time. For example, test results associated with one or more tests can be stored for use in training a model, determining expected test results, or other purposes. In some examples, test results relative to various metrics can be accessed from storage to identify a correlation, or similarity, between metrics. Correlation information for different metrics can be used while validating test results and determining whether test results are expected or unexpected.

In some examples, the validation component 304 can validate the instruction update 320 based at least in part on comparing the aggregated test results 318 to a safety threshold. For example, the validation component 304 can output an indication that the instruction update is valid based on none of the tests 314 being associated with a failure status, or alternatively based on a number of failure statuses not exceeding the safety threshold. The validation component 304 can output an indication that the instruction update is invalid based on a number of failure statuses meeting or being below the safety threshold.

In some examples, test results (or aggregated test results) can be output for display in a user interface. For instance, a user can provide an input via the user interface indicating whether a failure status of a test is an expected result, or if the failure status should be verified with another test. In some examples, the test results can be aggregated as the aggregated test results 318 can represent human-readable data.

In various examples, a vehicle (e.g., the vehicle 402) can perform various actions based at least in part on the output data 312. For instance, the testing component 104 can generate a communication for sending to a planning component to cause the planning component to determine a trajectory for the vehicle 402 to follow in the environment. The trajectory (e.g., direction, speed, acceleration, etc.) can enable the vehicle to avoid static and/or dynamic objects such as a pedestrian and/or other vehicles. The output data 312 can also or instead be used by the vehicle computing device to determine a position, a pose, a velocity, etc., of the vehicle. Potential actions by the vehicle are further described in relation to FIG. 4, and elsewhere.

By implementing the techniques described herein, safety of the autonomous vehicle can be improved by determining tests that represent vehicle performance over time including having at least some different versions of computer-readable instructions. In some examples, the testing techniques enable vehicle performance determinations regardless of changes in hardware, software, and/or firmware of a vehicle computing device of the vehicle. The tests results can, for example, be defined to test how a vehicle responds to an object(s) in a simulated scenario and/or a real-world environment.

Figure 4:
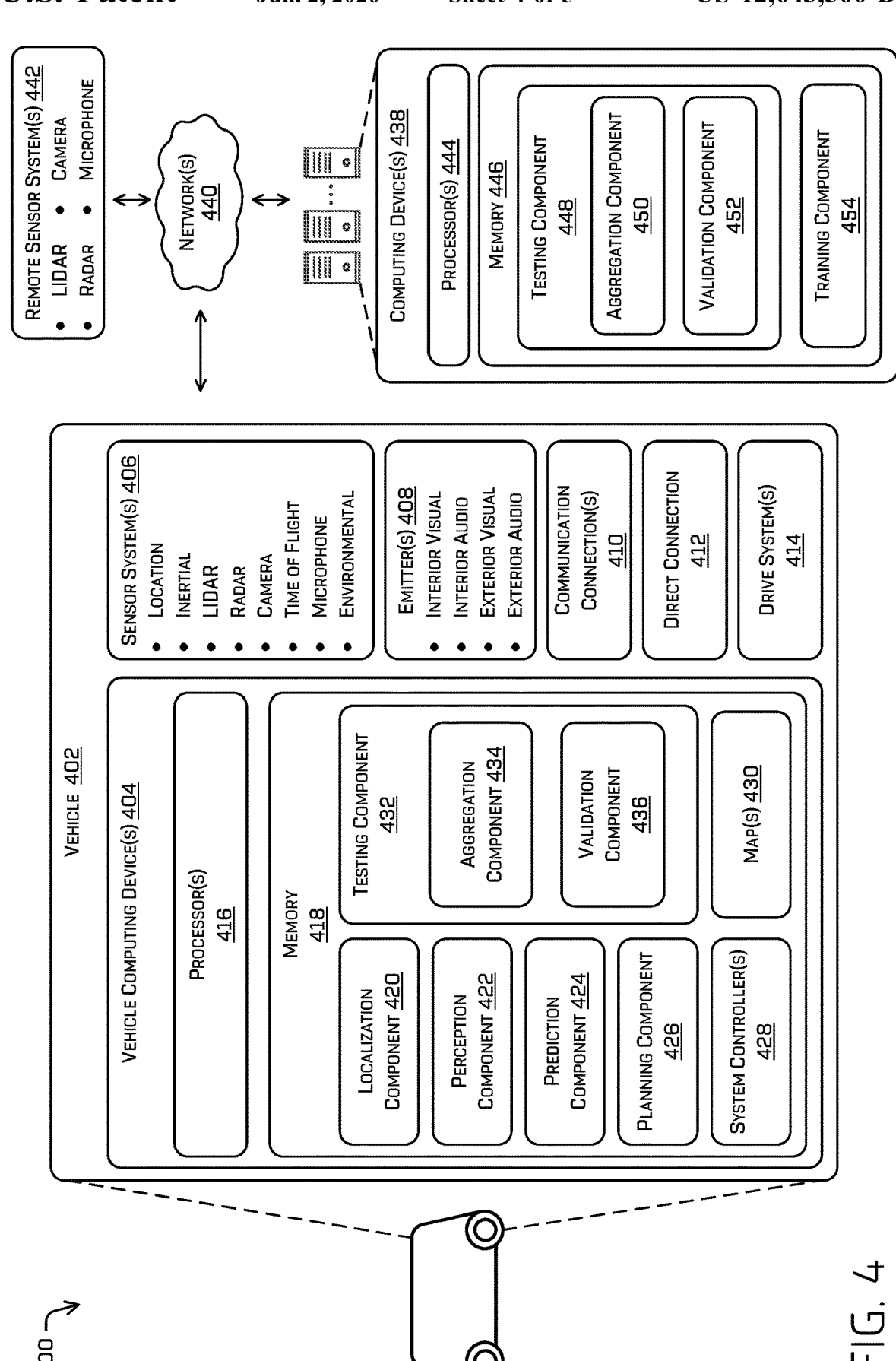
FIG. 4 is a block diagram of an example system for implementing the techniques described herein.

FIG. 4 is a block diagram of an example system 400 for implementing the techniques described herein. In at least one example, the system 400 can include a vehicle 402. In the illustrated example system 400, the vehicle 402 is an autonomous vehicle; however, the vehicle 402 can be any other type of vehicle.

The vehicle 402 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 402 can be configured to control all functions from start to completion of the trip, including all parking functions, it may not include a driver and/or controls for driving the vehicle 402, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 402 can include one or more computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414. The one or more sensor system(s) 406 can be configured to capture sensor data associated with an environment.

The one or more sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The one or more sensor system(s) 406 can provide input to the vehicle computing device(s) 404.

The vehicle 402 can also include one or more emitter(s) 408 for emitting light and/or sound. The one or more emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 can also include one or more communication connection(s) 410 that enable communication between the vehicle 402 and one or more other local or remote computing device(s) (e.g., a remote teleoperation computing device) or remote services. For instance, the one or more communication connection(s) 410 can facilitate communication with other local computing device(s) on the vehicle 402 and/or the one or more drive system(s) 414. Also, the one or more communication connection(s) 410 can allow the vehicle 402 to communicate with other nearby computing device(s) (e.g., other nearby vehicles, traffic signals, etc.).

The one or more communications connection(s) 410 can include physical and/or logical interfaces for connecting the vehicle computing device(s) 404 to another computing device or one or more external networks 440 (e.g., the Internet). For example, the one or more communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 402 can include one or more drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and to control operation of the various vehicle systems. In some examples, the drive system controller can include one or more processor(s) and memory communicatively coupled with the one or more processor(s). The memory can store one or more components to perform various functionalities of the drive system(s) 414. Furthermore, the drive system(s) 414 also include one or more communication connection(s) that enable communication by the respective drive system with one or more other local or remote computing device(s).

The vehicle computing device(s) 404 can include one or more processor(s) 416 and memory 418 communicatively coupled with the one or more processor(s) 416. In the illustrated example, the memory 418 of the vehicle computing device(s) 404 stores a localization component 420, a perception component 422, a prediction component 424, a planning component 426, one or more system controllers 428, one or more maps 430, and a testing component 432 including an aggregation component 434 and a validation component 436. Though depicted as residing in the memory 418 for illustrative purposes, it is contemplated that the localization component 420, the perception component 422, the prediction component 424, the planning component 426, the one or more system controllers 428, the one or more maps 430, the testing component 432, the aggregation component 434, and the validation component 436 may additionally, or alternatively, be accessible to the vehicle 402 (e.g., stored on, or otherwise accessible by, memory remote from the vehicle 402, such as, for example, on memory 446 of a remote computing device 438).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430 and/or a remote map component, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 424 can generate one or more probability maps representing prediction probabilities of possible locations of one or more objects in an environment. For example, the prediction component 424 can generate one or more probability maps for vehicles, pedestrians, animals, and the like within a threshold distance from the vehicle 402. In some instances, the prediction component 424 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 424 may generate predicted trajectories of objects (e.g., objects) in an environment and/or to generate predicted candidate trajectories for the vehicle 402. For example, the prediction component 424 may generate one or more predicted trajectories for objects within a threshold distance from the vehicle 402. In some examples, the prediction component 424 may measure a trace of an object and generate a trajectory for the object based on observed and predicted behavior.

In general, the planning component 426 may determine a path for the vehicle 402 to follow to traverse through an environment. For example, the planning component 426 may determine various routes and trajectories and various levels of detail. For example, the planning component 426 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 426 may generate an instruction for guiding the autonomous vehicle along at least a portion of the route from the first location to the second location. In at least one example, the planning component 426 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 426 can select a trajectory for the vehicle 402 based at least in part on receiving data representing an output of the testing component 432 (e.g., the output data 112, the output data 312).

In other examples, the planning component 426 can alternatively, or additionally, use data from the localization component 420, the perception component 422, and/or the prediction component 424 to determine a path for the vehicle 402 to follow to traverse through an environment. For example, the planning component 426 can receive data from the localization component 420, the perception component 422, and/or the prediction component 424 regarding objects associated with an environment. Using this data, the planning component 426 can determine a route to travel from a first location (e.g., a current location) to a second location (e.g., a target location) to avoid objects in an environment. In at least some examples, such a planning component 426 may determine there is no such collision free path and, in turn, provide a path which brings vehicle 402 to a safe stop avoiding all collisions and/or otherwise mitigating damage. Additionally or alternatively, the planning component 426 can determine the path for the vehicle 402 to follow based at least in part on data received from the testing component 104 as described in FIGS. 1-4 and elsewhere.

In at least one example, the vehicle computing device 404 may include one or more system controllers 428, which may be configured to control steering, propulsion, braking, safety, emitters, communication, and other systems of the vehicle 402. The system controller(s) 428 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 424, and/or the planning component 426 to determine a location of the vehicle 402, detect objects in an environment, generate routes, determine actions and/or trajectories to navigate within an environment.

In some examples, the one or more maps 430 may be used by the testing component 432 or the testing component 448 to select or perform a test in an environment. For instance, the vehicle 402 can implement the testing component 432 to test an update (e.g., a change in a metric, a change in a computer-readable instruction, etc.) to a component, the sensor system(s) 406, the drive system(s) 414, the system controller(s) 428, or other entity of the vehicle 402.

In some examples, the one or more maps 430 may be stored on a remote computing device(s) (such as the computing device(s) 438) accessible via network(s) 440. In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

As illustrated in FIG. 4, the vehicle computing device 404 may include the testing component 432 configured to perform at least the functionality of the testing component 104, including determining performance of different components. In various examples, the testing component 432 may receive sensor data, vehicle data, and the like from the perception component 422 and/or from the sensor system(s) 406. In some examples, the testing component 432 may receive environment characteristics (e.g., environmental factors, etc.) and/or weather characteristics (e.g., weather factors such as snow, rain, ice, etc.) from the perception component 422 and/or the sensor system(s) 406. While shown separately in FIG. 4, the testing component 432 could be part of the prediction component 424, the planning component 426, or other component(s) of the vehicle 402.

In various examples, the testing component 432 can define tests for a particular component and/or determine metrics to measure during the tests. For example, the testing component 432 can determine component performance relative to metrics (e.g., the metrics 316). In some examples, the aggregation component 434 can aggregate input data from various sources, aggregate test results associated with a component, aggregate test results associated with multiple components, etc. The aggregation component 434 can include at least the functionality of the aggregation component 302 including determining a response(s) of the component to the tests.

The validation component 436 can include at least the functionality of the validation component 304 of FIG. 3 including validating test results from the one or more tests performed by the testing component 104.

In some examples, the vehicle 402 may send sensor data to the computing device(s) 438 via the network(s) 440. In some examples, the vehicle 402 may receive sensor data from the computing device(s) 438 and/or remote sensor system(s) 442 via the network(s) 440. The sensor data may include raw sensor data and/or processed sensor data and/or representations of sensor data. In some examples, the sensor data (raw or processed) may be sent and/or received as one or more log files.

The computing device(s) 438 may include processor(s) 444 and a memory 446 storing a testing component 448, an aggregation component 450, and a validation component 452, and a training component 454. In various examples, the testing component 448 may be configured to receive data from one or more remote sensors, such as the sensor system(s) 406 and/or remote sensor system(s) 442. In some examples, the testing component 448 may be configured to process the data and send processed sensor data to the vehicle computing device 404, such as for use by the perception component 422, the prediction component 424, and/or the planning component 426. In some examples, the testing component 448 may be configured to send validated instruction update data to a component or entity of the vehicle computing device 404.

The testing component 448 can be configured to perform the functionality of the testing component 104, including predicting a degraded state for a sensor coupled to the vehicle 402. For instance, the testing component 448 can define a test, initiate a test, analyze test results, and aggregate input data and/or test results . . . . In some examples, the testing component 448 can be configured to perform tests automatically responsive to detecting an update to an instruction or metric associated with a test.

The aggregation component 450 can include at least the functionality of the aggregation component 302. For example, the aggregation component 450 can process sensor data from one or more sensors of the sensor system(s) 406 to initiate tests of an instruction update. The validation component 452 can include at least the functionality of the validation component 304.

As can be understood, the components discussed herein (e.g., the testing component 448, the aggregation component 450, and the validation component 452) are described as divided for illustrative purposes. However, the operations performed by the various components may be combined or performed in any other component.

In some instances, the training component 454 can include functionality to train a machine learning model to identify a relationship (e.g., a co-dependency) among multiple metrics and predict whether a change to another metric is caused by the metrics having the relationship. For example, the training component 454 can receive a variety of training data (e.g., metrics used for different components, similarity scores between metrics, sensor data, etc.) as an input to train the machine learning model. In some examples, the training component 454 can train the testing component 432 to determine how a change to an instruction affects a metric associated with a test, identify related metrics that also changed during testing, and/or determine whether the change to the other metric(s) is intended or unintended (e.g., expected or unexpected).

In some examples, the testing component 432 can identify metrics that cause an unintended change to another metric based at least in part on correlation information associated with the metrics. For example, historical test results (and other data) can be input into a model that is configured to output an indication of whether test results for two or more metrics change at a same time responsive to a previous change to one of the metrics.

In some instances, the training component 454 may be executed by the processor(s) 444 to train a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining an obstruction score associated with a lidar sensor and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

While examples are given in which the techniques described herein are implemented by a detector component of the vehicle, in some examples, some or all of the techniques described herein could be implemented by another system of the vehicle, such as a secondary safety system. Generally, such an architecture can include a first computing device to control the vehicle 402 and a secondary safety system that operates on the vehicle 402 to validate operation of the primary system and to control the vehicle 402 to avoid collisions.

In some instances, aspects of some or all of the components discussed herein may include any models, techniques, and/or machine learned techniques. For example, in some instances, the components in the memory 418 (and the memory 446, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, Hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 416 of the vehicle computing device(s) 404 and the processor(s) 444 of the computing device(s) 438 can be any suitable processor capable of executing instructions to process data and perform operations as described herein. By way of example and not limitation, the processor(s) 416 and the processor(s) 444 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 of the vehicle computing device 404 and the memory 446 of the computing device(s) 438 are examples of non-transitory computer-readable media. The memory 418 and the memory 446 can store an operating system and one or more software applications, instructions, programs, and/or data to implement the methods described herein and the functions attributed to the various systems. In various implementations, the memory 418 and 446 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Accordingly, the techniques discussed herein provide a robust implementation of determining a calibration score associated with a sensor to determine a level of accuracy of the sensor to allow the safe operation of an autonomous vehicle.

It should be noted that while FIG. 4 is illustrated as a distributed system, in alternative examples, components of the vehicle 402 may be associated with the computing device(s) 438 and/or components of the computing device(s) 438 may be associated with the vehicle 402. That is, the vehicle 402 may perform one or more of the functions associated with the computing device(s) 438, and vice versa.

FIG. 5 is an example process 500 for testing and validating an instruction update for an example component. For example, some or all of the process 500 can be performed by one or more components in FIG. 4, as described herein. For example, some or all of the process 500 can be performed by the testing component 432 and/or the testing component 448. Some or all of the process 500 can also or instead be performed by the testing component 104 of FIG. 1. In various examples, the process 500 can be associated with a simulated environment or a real-world environment.

At operation 502, the process can include receiving first data associated with a vehicle such as an autonomous vehicle. In some examples, the operation 502 can include the testing component 432 receiving vehicle state data from the localization component 420, the prediction component 424 of the vehicle 402. Vehicle state data may also or instead be received from a remote computing device such as the computing device(s) 438. In some examples, the vehicle state data can include a position, a trajectory, a yaw, a pitch, a roll, and the like for the vehicle 402. In some examples, the testing component 432 can determine a test for one or more components based on the vehicle state data (e.g., a different test for a vehicle moving at higher velocities on a highway versus a test for a vehicle surrounded by a relatively large number of objects). In some examples, the vehicle state data can represent a pose, an orientation, and/or a coordinate position (in x, y, and/or z space) in an environment.

In some examples, the first data of the operation 502 can include sensor data associated with the vehicle 402 such as from one or more sensor(s) associated with the vehicle. For example, sensor configuration data representing settings of the one or more sensors associated with the vehicle can be received as the first data. Additionally or alternatively, the first data can comprise log data indicating a level of performance for the vehicle during navigation in an environment at a previous time. In some examples, the first data can comprise metadata indicating a cause for the vehicle to disengage from operating in an environment for a period of time and/or a cause for the vehicle to request assistance from a remote operator (e.g., a human or a machine learned model).

At operation 504, the process can include receiving second data representing a change in a parameter or a metric associated with a component that controls operation of the vehicle. In various examples, the testing component 104 can receive, as the second data, computer-readable instructions that are executable by a processor(s) to cause operation of a component. The second data can represent a parameter or setting that causes the component to operate.

At operation 506, the process can include performing a first test based at least in part on the first data and a second test based at least in part on the first data and the second data. For instance, the testing component 432 can initiate the tests 314 having different metrics 316 for two or more components (e.g., the component being updated with the second data and another component not targeted to receive the second data). In some examples, the first test and the second test can be performed automatically based at least in part on receiving the second data (e.g., detecting an update) while in other examples the tests can be responsive to receiving a user input from a user interface at a previous time indicating to use the second data for testing.

In various examples, performing the first test comprises determining a first response by the first component relative to a first metric and determining a second response by a second component relative to a second metric different from the first metric, and performing the second test comprises determining a third response by the first component relative to the first metric and determining a fourth response by the second component relative to the second metric.

At operation 508, the process can include determining a difference between first results of the first test and second results of the second test. For instance, the aggregation component 434 can aggregate test results from the first test and the second test (e.g., aggregate a number of pass and failure status responses by the respective components during the tests). In some examples, the difference can represent a change between the third response and the first response associated with the first component and/or a change between the fourth response and the second results associated with the second component.

In some examples, the testing component 432 can compare the difference to a difference threshold, and a) based at least in part on the difference meeting or exceeding the difference threshold, outputting an indication that the second data caused performance by the component to degrade from the first test to the second test, or b) based at least in part on the difference being below the difference threshold, transmitting the second data to a vehicle computing device associated with the vehicle to cause an operating version of the vehicle computing device to update.

In various examples, determining the difference between the first results of the first test and the second results of the second test comprises determining a change in a number of requests for assistance or a change in a number of disengagements originating by the vehicle between the first results and the second results. For instance, the number of requests for assistance and/or the number of disengagements originating by the vehicle can be associated with a simulated environment or a real-world environment.

At operation 510, the process can include validating whether to use the second data for controlling the vehicle in a real-world environment based at least in part on the difference. For example, the operation 510 can include the testing component 104 implementing the validation component 304 to determine whether any degradation in performance of a component not being updated occurs during a test, and if so, whether the degradation is an expected change based on a type of test or metric being used. In some examples, validating comprises receiving an input from a user interface or a machine learned model indicating that the degradation is an expected change due to a dependency between two components, metrics, or the like.

The operation 510 may be followed by the operation 512 if the second data is valid (e.g., "yes" in the operation 510). The operation 510 may continue to operation 514 the second data is not valid (e.g., "no" in the operation 510).

In some examples, the testing component 432 can generate data representing the test results for display in a user interface of a display device. In such examples, validating the second data can include receiving a user input via the user interface verifying the difference between the first results of the first test and the second results of the second test are one of: an expected result or an unexpected result. Validating the second data for controlling the vehicle in the real-world environment can, for example, be based at least in part on the difference being the expected result as indicated by the user input.

In some examples, determining a valid status or an invalid status for the second data can be based at least in part on a machine learned model determining whether a change in a response between tests is an expected change caused by an instruction update or an unexpected change (e.g., the change between the third response and the fourth response associated with the second component is unexpected). In some examples, the testing component 432 can output an indication that the second data is invalid for transmitting to a vehicle computing device for controlling the vehicle based at least in part on the change between the fourth response and the second response associated with the second component being an unexpected change.

As discussed herein, an output(s) from the testing component 432 can be sent to one or more of: a vehicle computing device (e.g., the vehicle computing device 404), a perception component (e.g., the perception component 422), a prediction component (the prediction component 424), a planning component (e.g., the planning component 426), the system controller(s) 428, and the like. The output(s) from the testing component 432 can also or instead be sent to a remote computing device configured to train the testing component 432.

Though the process 500 is discussed in the context of vehicle in some examples the techniques discussed herein can include other robotic devices or systems.

FIGS. 2 and 5 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. For instance, the example process may omit operation 512 and the operation 514 can be performed based at least in part on the second data needing a further action The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples described herein.

A: A system comprising: one or more processors; and one or more non-transitory computer-readable media storing computer-executable instructions that, when executed, cause the one or more processors to perform operations comprising: receiving first data representing one or more of: vehicle state data associated with an autonomous vehicle, sensor configuration data representing settings of one or more sensors associated with the autonomous vehicle, log data indicating a level of performance for the autonomous vehicle during navigation in an environment at a previous time, or metadata indicating a cause for the autonomous vehicle to disengage or to request assistance from a remote operator; receiving second data representing a change in a parameter or a first metric associated with a component associated with controlling operation of the autonomous vehicle; performing a first test based at least in part on the first data and a second test based at least in part on the first data and the second data; determining a difference between first test results of the first test and second test results of the second test, the first test results representing a response by the component prior to the change to the first metric and the second test results representing a response by the component relative to a second metric different from the first metric; and validating whether to use the second data for controlling the autonomous vehicle in a real-world environment based at least in part on the difference, wherein at least a portion of the first data changes dynamically from a first time associated with receiving the first data to a second time associated with the validating.

B: The system of paragraph A, the operations further comprising: comparing the difference to a difference threshold, and one of: based at least in part on the difference meeting or exceeding the difference threshold, outputting an indication that the second data caused performance by the component to degrade from the first test to the second test, or based at least in part on the difference being below the difference threshold, transmitting the second data to a vehicle computing device associated with the autonomous vehicle to cause an operating version of the vehicle computing device to update.

C: The system of paragraph A or B, wherein: the first test results indicate a first response by the component relative to the first metric, the second test results indicate a second response by the component relative to the second metric, and the difference between the first test results of the first test and the second test results of the second test indicate a change in a number of requests for assistance originating by the autonomous vehicle between the second response and the first response.

D: The system of any of paragraphs A-C, the operations further comprising causing the first test results, the second test results, or the difference between the first test results and the second test results to be presented in a user interface.

E: The system of any of paragraphs A-D, wherein: at least one of: the first test results or the second test results indicates a pass status or a failure status for a response by the component to meet or exceed a target metric.

F: One or more non-transitory computer-readable media storing instructions executable by one or more processors, wherein the instructions, when executed, cause the one or more processors to perform operations comprising: receiving first data representing one or more of: vehicle state data associated with a vehicle, sensor configuration data representing a setting of a sensor associated with the vehicle, log data indicating a level of performance for the vehicle during navigation in an environment at a previous time, or metadata indicating a cause for the vehicle to disengage or to request assistance from a remote operator; receiving second data representing a change in a parameter or a first metric associated with a component associated with controlling operation of the vehicle; performing a first test based at least in part on the first data and a second test based at least in part on the first data and the second data; determining a difference between first results of the first test and second results of the second test, the first results representing a response by the component prior to the change to the first metric and the second results representing a response by the component relative to a second metric different from the first metric; and validating whether to use the second data for controlling the vehicle in a real-world environment based at least in part on the difference.

G: The one or more non-transitory computer-readable media of paragraph F, the operations further comprising: performing the first test and the second test automatically based at least in part on one of: receiving the second data or receiving a user input from a user interface.

H: The one or more non-transitory computer-readable media of paragraph F or G, the operations further comprising: outputting third data for display in a user interface, the third data representing the difference between the first results and the second results; and receiving a user input via the user interface verifying the difference between the first results of the first test and the second results of the second test as an expected result or as an unexpected result, wherein validating the second data for controlling the vehicle in the real-world environment is further based at least in part on the difference being the expected result.

I: The one or more non-transitory computer-readable media of any of paragraphs F-H, wherein at least a portion of the first data changes dynamically over time.

J: The one or more non-transitory computer-readable media of any of paragraphs F-I, wherein: the first data is received at a first time, the second data is validated at a second time after the first time, and at least a portion of the first data changes between the first time and the second time.

K: The one or more non-transitory computer-readable media of any of paragraphs F-J, wherein validating whether to use the second data for controlling the vehicle in the real-world environment comprises: comparing the difference to a difference threshold, and one of: based at least in part on the difference meeting or exceeding the difference threshold, outputting an indication that the second data caused performance by the component to degrade from the first test to the second test, or based at least in part on the difference being below the difference threshold, transmitting the second data to a vehicle computing device associated with the vehicle to cause an operating version of the vehicle computing device to update.

L: The one or more non-transitory computer-readable media of any of paragraphs F-K, wherein determining the difference between the first results of the first test and the second results of the second test comprises determining a change in a number of requests for assistance originating by the vehicle between the first results and the second results.

M: The one or more non-transitory computer-readable media of any of paragraphs F-L, the operations further comprising: aggregating, as aggregated data, the first results and the second results, wherein the aggregated data includes a graphical indicator for output in a user interface.

N: The one or more non-transitory computer-readable media of any of paragraphs F-M, wherein the first results or the second results indicate a pass status or a failure status for a response by the component to meet or exceed a target metric.

O: The one or more non-transitory computer-readable media of any of paragraphs F-N, the operations further comprising: determining third data indicating a correlation between the first metric and the second metric based at least in part on a change in a test causing a first change to the first metric and a second change to the second metric; and determining that the second results represent expected results based at least in part on the third data.

P: The one or more non-transitory computer-readable media of any of paragraphs F-O, wherein: the first metric is configured to capture performance by the component.

Q: A method comprising: receiving first data representing one or more of: vehicle state data associated with a vehicle, sensor configuration data representing a setting of a sensor associated with the vehicle, log data indicating a level of performance for the vehicle during navigation in an environment at a previous time, or metadata indicating a cause for the vehicle to disengage or to request assistance from a remote operator; receiving second data representing a change in a parameter or a first metric associated with a component associated with controlling operation of the vehicle; performing a first test based at least in part on the first data and a second test based at least in part on the first data and the second data; determining a difference between first results of the first test and second results of the second test, the first results representing a response by the component prior to the change to the first metric and the second results representing a response by the component relative to a second metric different from the first metric; and validating whether to use the second data for controlling the vehicle in a real-world environment based at least in part on the difference.

R: The method of paragraph Q, further comprising: outputting third data for display in a user interface, the third data representing the difference between the first results and the second results; and receiving a user input via the user interface verifying the difference between the first results of the first test and the second results of the second test as an expected result or as an unexpected result, wherein validating the second data for controlling the vehicle in the real-world environment is further based at least in part on the difference being the expected result.

S: The method of paragraph Q or R, wherein validating whether to use the second data for controlling the vehicle in the real-world environment comprises: comparing the difference to a difference threshold, and one of: based at least in part on the difference meeting or exceeding the difference threshold, outputting an indication that the second data caused performance by the component to degrade from the first test to the second test, or based at least in part on the difference being below the difference threshold, transmitting the second data to a vehicle computing device associated with the vehicle to cause an operating version of the vehicle computing device to update.

T: The method of any of paragraphs Q-S, further comprising: aggregating, as aggregated data, the first results and the second results, wherein the aggregated data includes a graphical indicator for output in a user interface.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
   receiving first data representing one or more of:
      vehicle state data associated with a vehicle,
      sensor configuration data representing a setting of a sensor associated with the vehicle,
      log data indicating a level of performance for the vehicle during navigation in an environment at a previous time, or
      metadata indicating a cause for the vehicle to disengage or to request assistance from a remote operator;
   receiving second data representing a change in a first metric associated with a component associated with controlling operation of the vehicle;
   performing a first test based at least in part on the first data and a second test based at least in part on the first data and the second data;
   determining a difference between first results of the first test and second results of the second test, the first results representing a first response by the component to the first test prior to the change to the first metric and the second results representing a second response by the component to the second test, the second results relative to a second metric different from the first metric; and
   validating whether to use the second data for controlling the vehicle in a real-world environment based at least in part on the difference.

2. The method of claim 1, further comprising:
   outputting third data for display in a user interface, the third data representing the difference between the first results and the second results; and
   receiving a user input via the user interface verifying the difference between the first results of the first test and the second results of the second test as an expected result or as an unexpected result,
   wherein validating the second data for controlling the vehicle in the real-world environment is further based at least in part on the difference being the expected result.

3. The method of claim 1, wherein validating whether to use the second data for controlling the vehicle in the real-world environment comprises:
   comparing the difference to a difference threshold, and one of:
      based at least in part on the difference meeting or exceeding the difference threshold, outputting an indication that the second data caused performance by the component to degrade from the first test to the second test, or
      based at least in part on the difference being below the difference threshold, transmitting the second data to a vehicle computing device associated with the vehicle to cause an operating version of the vehicle computing device to update.

4. The method of claim 1, further comprising:

aggregating, as aggregated data, the first results and the second results, wherein the aggregated data includes a graphical indicator for output in a user interface.

5. A system comprising:

one or more processors; and one or more non-transitory computer-readable media storing computer-executable instructions that, when executed, cause the one or more processors to perform operations comprising:

receiving first data representing one or more of:

vehicle state data associated with an autonomous vehicle, sensor configuration data representing settings of one or more sensors associated with the autonomous vehicle, log data indicating a level of performance for the autonomous vehicle during navigation in an environment at a previous time, or metadata indicating a cause for the autonomous vehicle to disengage or to request assistance from a remote operator;

receiving second data representing a change in a first metric associated with a component associated with controlling operation of the autonomous vehicle;

performing a first test based at least in part on the first data and a second test based at least in part on a combination of the first data and the second data;

determining a difference between first test results of the first test and second test results of the second test, the first test results representing a first response by the component to the first test prior to the change to the first metric and the second test results representing a second response by the component to the second test, the second test results relative to a second metric different from the first metric; and validating whether to use the second data for controlling the autonomous vehicle in a real-world environment based at least in part on the difference, wherein at least a portion of the first data changes dynamically from a first time associated with receiving the first data to a second time associated with the validating.

6. The system of claim 5, the operations further comprising: comparing the difference to a difference threshold, and one of:

based at least in part on the difference meeting or exceeding the difference threshold, outputting an indication that the second data caused performance by the component to degrade from the first test to the second test, or based at least in part on the difference being below the difference threshold, transmitting the second data to a vehicle computing device associated with the autonomous vehicle to cause an operating version of the vehicle computing device to update.

7. The system of claim 5, wherein:

the first test results indicate the first response by the component relative to the first metric, the second test results indicate the second response by the component relative to the second metric, and the difference between the first test results of the first test and the second test results of the second test indicates a change in a first number of requests for assistance originating by the autonomous vehicle in the second response relative to a second number of requests for assistance originating by the autonomous vehicle in the first response.

8. The system of claim 5, the operations further comprising:

causing the first test results, the second test results, or the difference between the first test results and the second test results to be presented in a user interface.

9. The system of claim 5, wherein:

at least one of: the first test results or the second test results indicate a pass status or a failure status for a response by the component to meet or exceed a target metric.

10. One or more non-transitory computer-readable media storing instructions executable by one or more processors, wherein the instructions, when executed, cause the one or more processors to perform operations comprising:

receiving first data representing one or more of:

vehicle state data associated with a vehicle, sensor configuration data representing a setting of a sensor associated with the vehicle, log data indicating a level of performance for the vehicle during navigation in an environment at a previous time, or metadata indicating a cause for the vehicle to disengage or to request assistance from a remote operator;

receiving second data representing a change in a first metric associated with a component associated with controlling operation of the vehicle;

performing a first test based at least in part on the first data and a second test based at least in part on the first data and the second data;

determining a difference between first results of the first test and second results of the second test, the first results representing a first response by the component to the first test prior to the change to the first metric and the second results representing a second response by the component to the second test, the second results relative to a second metric different from the first metric; and validating whether to use the second data for controlling the vehicle in a real-world environment based at least in part on the difference.

11. The one or more non-transitory computer-readable media of claim 10, the operations further comprising:

performing the first test and the second test automatically based at least in part on one of: receiving the second data or receiving a user input from a user interface.

12. The one or more non-transitory computer-readable media of claim 10, the operations further comprising:

outputting third data for display in a user interface, the third data representing the difference between the first results and the second results; and receiving a user input via the user interface verifying the difference between the first results of the first test and the second results of the second test as an expected result or as an unexpected result, wherein validating the second data for controlling the vehicle in the real-world environment is further based at least in part on the difference being the expected result.

13. The one or more non-transitory computer-readable media of claim 10, wherein at least a portion of the first data changes dynamically over time.

14. The one or more non-transitory computer-readable media of claim 10, wherein:

the first data is received at a first time, the second data is validated at a second time after the first time, and at least a portion of the first data changes between the first time and the second time.

15. The one or more non-transitory computer-readable media of claim 10, wherein validating whether to use the second data for controlling the vehicle in the real-world environment comprises:

comparing the difference to a difference threshold, and one of:

based at least in part on the difference meeting or exceeding the difference threshold, outputting an indication that the second data caused performance by the component to degrade from the first test to the second test, or based at least in part on the difference being below the difference threshold, transmitting the second data to a vehicle computing device associated with the vehicle to cause an operating version of the vehicle computing device to update.

16. The one or more non-transitory computer-readable media of claim 10, wherein determining the difference between the first results of the first test and the second results of the second test comprises determining a change in a number of requests for assistance originating by the vehicle between the first results and the second results.

17. The one or more non-transitory computer-readable media of claim 10, the operations further comprising:

aggregating, as aggregated data, the first results and the second results, wherein the aggregated data includes a graphical indicator for output in a user interface.

18. The one or more non-transitory computer-readable media of claim 10, wherein the first results or the second results indicate a pass status or a failure status for a response by the component to meet or exceed a target metric.

19. The one or more non-transitory computer-readable media of claim 10, the operations further comprising:

determining third data indicating a correlation between the first metric and the second metric based at least in part on a change in a test causing a first change to the first metric and a second change to the second metric; and determining that the second results represent expected results based at least in part on the third data.

20. The one or more non-transitory computer-readable media of claim 10, wherein:

the first metric is configured to capture first performance by the component relative to the first test and the second metric is configured to capture second performance by the component relative to the second test.

* * * * *